Patented June 20, 1950

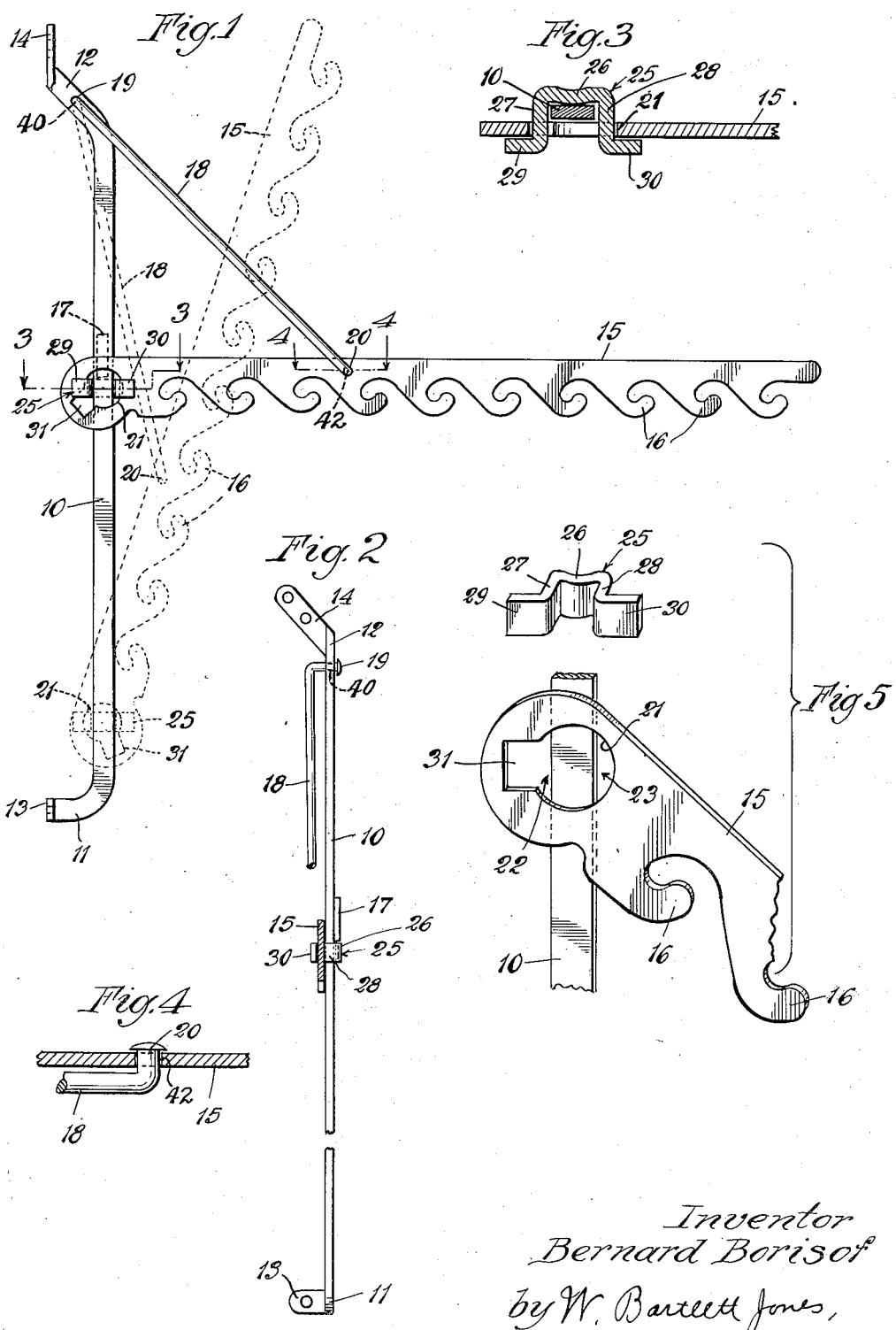

2,512,413

UNITED STATES PATENT OFFICE 2,512,413

HANGER AND MECHANICAL CONNECTION

Bernard Borisof, Chicago, Ill., assignor of one-half to Bernard R. Berk and one-half to Sidney Borenstein, both of Chicago, Ill.

Application February 11, 1948, Serial No. 7,609

5 Claims. (Cl. 211—100)

The present invention relates to mechanics and particularly to a sliding pivot connection for two relatively movable members. The invention is illustrated by a hanger embodying such connection.

It is the general object of the invention to provide a simple construction for a sliding pivot for two relatively movable parts.

It is a particular object of the invention to provide a single element cooperatively related to and readily assembled with two parts to effect a sliding pivotal connection.

It is another object of the invention to provide a novel folding hanger having a simple assembly construction and normally set against disassembly of a sliding pivotal connection therein.

The invention may be used in many places and devices and it is not necessarily limited to embodiment as a hanger. It is illustrated as it has been employed in a hanger. In the drawings:

Fig. 1 is a view of the hanger in normal position, showing the arm in dotted line as it folds.

Fig. 2 is a vertical view taken looking toward the left in Fig. 1, cutting across the hanger arm.

Fig. 3 is a cross section on the line 3—3 of Fig. 1 showing a detail of the sliding pivot.

Fig. 4 is a cross section on line 4—4 of Fig. 1 showing the mounting of the suspension link.

Fig. 5 shows the parts in position to be assembled to produce the sliding pivot.

The hanger has a vertical mounting rod 10 with ends 11 and 12 extending in the same general lateral direction and provided with mounting portions or plates 13 and 14, respectively, for securing the rod to a flat wall, but spaced from it.

The mounting rod carries a hanger arm 15 which in horizontal position presents a plurality of hooks 16. The hanger is movable from horizontal position to an inoperative position by suitable connections to the mounting rod 10. One end of the hanger arm 15 has a sliding pivotal connection with the mounting rod 10, on which there is a suitable stop 17 to arrest the sliding movement upwardly of the hanger arm at its horizontal position. In such position there is suspension link 18 otherwise holding the arm 15 in horizontal position. Link 18 pivots in a vertical plane about its mounted end 19 in a hole 40 in the mounting rod 10 and at its mounted end 20 in a hole 42 in the hanger arm 15. Each end of the link is at right angles to the lengthwise extent of the link 18 and passes through suitable pivot holes beyond which the end is enlarged as a retaining head of simple construction.

The stop 17 may be of any suitable construction, and as shown, it is a slug spot-welded to the mounting rod 10. When the link 18 is in its normal position, the stop 17 has the additional function of preventing the hanger arm 15 from moving to the angular relation shown in Fig. 5, in which the particular sliding-pivotal connection may be readily taken apart.

The hanger arm 15 slides alongside the mounting rod, and has a circular hole 21, the area of which is intersected by the profile width of the rod 10, leaving lateral open area segments 22 and 23. A holder 25 secures the parts together. Holder 25 slides on the mounting rod and maintains its angular relationship therewith by reason of its conformation about the rod 10. As shown this is an U-shape with base 26 and U-legs 27 and 28. These legs extend on through the said segment areas 22 and 23 and beyond the hole they have lateral projections extending beyond the periphery of hole 21. As shown the legs 27 and 28 are turned through 90° providing ears 29 and 30 respectively which lie on the outside face of the hanger arm 15. Hole 21 has a notch-like extension 31 from its periphery into the material of arm 15 of size to pass the nearest ear 29 when in proper alinement. The notch is so positioned that in all positions of the completed folding hanger, such alinement is impossible. However, by removing the stop 17, or by removing the link 18, the arm 15 may be moved to an angle, pointing downwardly from the normal horizontal position, as shown in Fig. 5, such that notch 31 extends at right angles to the mounting rod 10, thus allowing the ear 29 to pass through and hence to allow the holder 25 to be removed.

In assembling the hanger the two parts 10 and 15 are brought together in the relationship shown in Fig. 5, the holder 25 is placed in position, then the hanger is completed as to both the stop 17 and the link 18.

The notch 31 may of course be dispensed with and the ears 29 and 30, or the like, be formed after inserting the corresponding U-structure through the segment areas 22 and 23. However, the notch permits the parts to be originally prepared in the conformation needed in functioning position.

The arm 15 is sufficiently long so that in folded position the free end of arm 15 cannot pass through the space (see Fig. 2) between link 18 and rod 10. This relates more particularly to the device either as an article of merchandise, or in its unmounted form, and prevents the arm 15 moving counterclockwise in Fig. 1 beyond the rod 10 to a position 180° from the position of Fig. 5. In such position the notch would let the ear 30 pass through and the parts to be thus disengaged. In a piece of merchandise which might be carelessly handled such opportunity for disengagement is to be avoided. The embodiment in a hanger as described obviates all danger of accidental opening of the connection when such notch is employed.

The rod 10 is preferably non-circular in cross-section, and as shown is a length of rectangular bar material deformed to the illustrated mounting rod. The holder 25 and the bar 15 are cooperatively designed so that the arm 15 in horizontal position is not able to turn in a horizontal plane about rod 10 as an axis. Thus, in use, the horizontal arm 15 cannot swing laterally, and remains freely movable only in a vertical plane. The arm 15 is also of flat bar stock with a flat face sliding on and adjacent one flat face of rod 10. The holder 25 (Fig. 3) has its parts arranged to hold the arm 15 flatwise, to, or non-rotatably about, the rod 10. Accordingly, the holder 25 is functionally related to the rod 10 and arm 15 to avoid undesired lateral swinging.

The link 18 is pivoted at 20 at a point on the arm 15 removed from the mounting rod 10, so that the weight of the arm beyond point 20 overbalances the weight on the other side, to maintain a horizontal position. However, no lock is provided to prevent upward swinging of the arm when a greater weight is hung between the rod and the link pivot 20. Such weight will readily move the arm into dotted line position or thereabouts (Fig. 1). Experience has shown that such position in a closet or on a door is desirable. The thickness of clothes or the like hung on the arm tends to move it into a suitable accommodating angular position, thus minimizing the horizontal extension of the device in actual use.

The invention, therefore, is subject to numerous modifications and embodiments as fall within the scope of the appended claims.

I claim:

1. A sliding pivotal connection comprising a mounting rod, a sliding member positioned closely adjacent the mounting rod to slide and pivot with respect thereto, said sliding member having a circular hole therein of diameter greater than the profile width of the mounting rod in sliding relation so as to leave open segments of said hole on each side of the rod, and a holder having a U-shaped portion encompassing the rod with its U-legs passing through said segments and having other portions extending outwardly and engaging the sliding member on the exterior side.

2. A sliding pivotal connection comprising a mounting rod, a sliding member positioned closely adjacent the mounting rod to slide and pivot with respect thereto, said sliding member having a circular hole therein of diameter greater than the profile width of the mounting rod in sliding relation so as to leave open segments of said hole on each side of the rod, a holder having a U-shaped portion encompassing the rod with its U-legs passing through said segments, and on each U-leg a lateral projection engaging the sliding member on the exterior side over the edge of the circular hole.

3. A sliding pivotal connection comprising a mounting rod, a sliding member positioned closely adjacent the mounting rod to slide and pivot with respect thereto, said sliding member having a circular hole therein of diameter greater than the profile width of the mounting rod in sliding relation so as to leave open segments of said hole on each side of the rod, a holder having a U-shaped portion encompassing the rod with the U-legs passing through said segments, and on each U-leg a lateral projection engaging the sliding member on the exterior side, said hole being recessed outwardly from its circumference to provide an area into which one of said projections may be moved to effect disengagement of the parts in a predetermined angular relation of the rod and member.

4. A sliding pivotal connection comprising a mounting rod, a sliding member positioned closely adjacent the mounting rod to slide and pivot with respect thereto, said sliding member having a circular hole therein of diameter greater than the profile width of the mounting rod in sliding relation so as to leave open segments of said hole on each side of the rod, and a holder having a U-shaped portion encompassing the rod and passing through said segments, a projection on each U-leg engaging the sliding member on the exterior side, said hole being recessed outwardly from its circumference to provide an area into which one of said projections may be moved to effect disengagement of the parts in a predetermined angular relation of the rod and member, and means positioned normally to prevent movement of the member on the rod into said angular relation.

5. A hanger comprising a normally vertical mounting rod, a sliding hanger arm positioned closely adjacent said rod to slide and pivot with respect thereto, said sliding arm having a circular hole therein of diameter greater than the profile width of the base rod in sliding relation so as to leave open segments of said hole on each side of the rod, and a holder having a U-shaped portion encompassing the rod with its U-legs passing through said segments, a projection on each U-leg of the holder engaging the hanger arm on the exterior side, said hole being recessed outwardly to provide an area into which one of said projections may be moved to effect disengagement of the parts in a predetermined angular relation of the rod and arm in which relation the arm points downwardly from the rod, a suspension link connecting the top of the rod with the hanger arm at a point remote from the pivot end, and a stop carried by the rod to prevent sliding of the arm on the rod toward said angular position past perpendicular relation to the rod.

BERNARD BORISOF.

REFERENCES CITED

The following references are of record in the file of this patent:

UNITED STATES PATENTS

| Number | Name | Date |
|---|---|---|
| 895,578 | McNamara | Aug. 11, 1908 |
| 1,246,585 | Geraerdts | Nov. 13, 1917 |
| 1,838,653 | Bergman | Dec. 29, 1931 |
| 1,896,654 | Weaton | Feb. 7, 1933 |
| 1,958,962 | Crosby | May 15, 1934 |
| 1,995,983 | Hesse | Mar. 26, 1935 |
| 2,425,146 | Comis et al. | Aug. 5, 1947 |